United States Patent
Sun et al.

(10) Patent No.: US 9,497,242 B2
(45) Date of Patent: Nov. 15, 2016

(54) ADAPTATION, SHUNT TRANSMISSION AND STREAM SWITCHING METHOD AND SYSTEM FOR COORDINATED SERVICE

(75) Inventors: Aifang Sun, Shenzhen (CN); Chong Gao, Shenzhen (CN); Zhihao Ling, Shenzhen (CN); Yifeng Yuan, Shenzhen (CN); Jianfu Cao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 254 days.

(21) Appl. No.: 14/369,101

(22) PCT Filed: Mar. 22, 2012

(86) PCT No.: PCT/CN2012/072834
§ 371 (c)(1),
(2), (4) Date: Jun. 26, 2014

(87) PCT Pub. No.: WO2013/097367
PCT Pub. Date: Jul. 4, 2013

(65) Prior Publication Data
US 2015/0113160 A1    Apr. 23, 2015

(30) Foreign Application Priority Data
Dec. 29, 2011 (CN) .......................... 2011 1 0452219

(51) Int. Cl.
*H04L 29/06* (2006.01)
*G06F 17/30* (2006.01)

(52) U.S. Cl.
CPC ....... *H04L 65/601* (2013.01); *G06F 17/30516* (2013.01); *H04L 65/4084* (2013.01); *H04L 65/602* (2013.01); *H04L 65/80* (2013.01)

(58) Field of Classification Search
CPC .................... G06F 17/30516; H04L 65/4084; H04L 65/601; H04L 65/602; H04L 65/80
USPC ........................................ 709/231, 239, 238
See application file for complete search history.

(56) References Cited

U.S. PATENT DOCUMENTS

| 6,678,736 B1* | 1/2004 | Malmkvist .......... H04L 12/5695 709/231 |
| 2007/0127509 A1* | 6/2007 | Lin .................... H04L 29/06027 370/401 |

(Continued)

FOREIGN PATENT DOCUMENTS

| CN | 101119314 A | 2/2008 |
| CN | 101198128 A | 6/2008 |

(Continued)

OTHER PUBLICATIONS

Supplementary European Search Report in European application No. 12862018.4, mailed on Oct. 21, 2015.

(Continued)

*Primary Examiner* — Alina N Boutah
(74) *Attorney, Agent, or Firm* — Oppedahl Patent Law Firm LLC

(57) ABSTRACT

The present disclosure provides an adaptation, shunt transmission and stream switching method and system for a coordinated service, and the method includes: a request message for service transmission is received from a terminal group; user context information, terminal context information and service context information are acquired according to the request message, and a service adaptation strategy and a service shunt strategy are established; the service adaptation strategy and the service shunt strategy are implemented, adaptation of the coordinated service is completed, and a shunt transmission of the coordinated service is performed; and during the shunt transmission, when a stream switching triggering condition is determined according to acquired network context information and terminal context information, the service shunt strategy and/or the service adaption strategy are updated according to a corresponding stream switching type, and a transmission path of a service stream is redirected. The present disclosure supports the implementation of stream switching, and provides a high-efficient service transmission and presentation service for individualized user service needs.

18 Claims, 5 Drawing Sheets

(56) References Cited

U.S. PATENT DOCUMENTS

| | | | | |
|---|---|---|---|---|
| 2008/0137541 A1* | 6/2008 | Agarwal | H04W 4/02 | 370/241 |
| 2009/0216897 A1* | 8/2009 | Wang | H04N 21/2343 | 709/231 |
| 2010/0268836 A1 | 10/2010 | Jabri | | |
| 2012/0151009 A1* | 6/2012 | Bouazizi | H04L 41/5067 | 709/219 |
| 2012/0259957 A1* | 10/2012 | Keum | H04L 65/4084 | 709/219 |
| 2013/0066623 A1* | 3/2013 | Chou | G06F 17/289 | 704/2 |
| 2013/0107741 A1* | 5/2013 | Huang | G06F 17/30539 | 370/252 |
| 2013/0208663 A1* | 8/2013 | Kanniappan | H04L 67/306 | 370/329 |
| 2013/0286868 A1* | 10/2013 | Oyman | H04W 24/06 | 370/252 |
| 2013/0346624 A1* | 12/2013 | Chervets | H04M 15/58 | 709/231 |
| 2014/0040498 A1* | 2/2014 | Oyman | H04W 24/04 | 709/231 |
| 2014/0219088 A1* | 8/2014 | Oyman | H04N 21/23439 | 370/231 |
| 2014/0258552 A1* | 9/2014 | Oyman | H04N 19/146 | 709/231 |
| 2015/0288530 A1* | 10/2015 | Oyman | H04W 56/00 | 370/312 |

FOREIGN PATENT DOCUMENTS

| | | |
|---|---|---|
| CN | 101626596 A | 1/2010 |
| CN | 101827396 A | 9/2010 |
| JP | 2011258112 A | 12/2011 |

OTHER PUBLICATIONS

International Search Report in international application No. PCT/CN2012/072834, mailed on Oct. 25, 2012.

English Translation of the Written Opinion of the International Search Authority in international application No. PCT/CN2012/072834, mailed on Oct. 25, 2012.

* cited by examiner

ADAPTATION, SHUNT TRANSMISSION AND STREAM SWITCHING METHOD AND SYSTEM FOR COORDINATED SERVICE

TECHNICAL FIELD

The present disclosure relates to the technical field of wireless communications, and in particular to an adaptation, shunt transmission and stream switching method and system for a coordinated service.

BACKGROUND

With the ever-increasing development of network application services, there are more requirements on the network connection bandwidth of a mobile terminal, and in particular to the downlink connection bandwidth. Therefore, usage of only one interface can not meet service needs. In this context, it is a current research focus to divide a service into several sub-streams and transmit them simultaneously by using multi-interface feature of a mobile terminal.

With the popularity of a multi-interface terminal having the capability of accessing a variety of networks, it becomes an effective way, which takes full advantage of network resources, properly balances loads, improves transmission efficiency and enhances Quality of Service (QoS) of user experiences, to transmit services through all interfaces of the terminal and by coordinating with peripheral devices. For this purpose, it is desirable to shunt a service desired by a user according to a specific strategy and transmit them coordinatedly through respective effective links.

Accordingly, the prior art provides some shunt strategies, including network-controlled shunt strategies and shunt service transmissions implemented in a terminal side, most of which shunt a service by adding a functional entity and considering synthetically factors such as network bandwidths, the type of a service and the like. However, during the transmission process of a coordinated service, if a network environment changes, a network layer should have the ability to detect this change, and thus ensures the continuity of the service by using a corresponding regulatory mechanism, i.e., there is a processing process of stream switching in the transmission process of the coordinated service. Nevertheless, the prior art does not provide effective solutions, and undoubtedly affects service experiences of a user. On the other hand, the provision of a ubiquitous service regards meeting user requirements as a starting point to achieve the objective of meeting the need of user consistency, i.e., when a user moves to a new environment, a service can be dynamically adapted according to environmental changes, and this is not yet involved in an existing coordinated service transmission technique.

SUMMARY

In view of the above, the present disclosure is intended to provide an adaptation, shunt transmission and stream switching method and system for a coordinated service, so as to support the implementation of a stream switching.

To this end, the technical solutions of the present disclosure are implemented as follows.

The present disclosure provides an adaptation, shunt transmission and stream switching method for a coordinated service, and the method includes:

a request message for service transmission is received from a terminal group;

user context information, terminal context information and service context information are acquired according to the request message, and a service adaptation strategy and a service shunt strategy are established;

the service adaptation strategy and the service shunt strategy are implemented, adaptation of the coordinated service is completed, and a shunt transmission of the coordinated service is performed; and during the shunt transmission, when a stream switching triggering condition is determined according to acquired network context information and terminal context information, the service shunt strategy and/or the service adaption strategy are updated according to a corresponding stream switching type, and a transmission path of a service stream is redirected.

The request message includes at least the following information: a user ID, a device ID, an IP address, port information and a service ID;

the user ID is an ID of a user who requests a service; the device ID is a device ID of a respective coordinated terminal in the terminal group; the IP address is an IP address of the respective coordinated terminal; the port information is information of a port transmitting a service in the respective coordinated terminal; and the service ID is an ID of a requested service.

The acquiring user context information, terminal context information and service context information according to the request message includes:

the user context information is acquired according to the user ID; the terminal context information is acquired according to the device ID and/or the IP address; and the service context information is acquired according to the service ID.

The establishing a service adaptation strategy includes:

information of a respective sub-service of a requested service is acquired according to the user context information and the service context information to generate service combination information;

a coordinated terminal which can present the requested service as a service component is selected from the terminal group according to the terminal context information; and respective service components are combined according to the user context information to generate service component assembly information; and a service deployment configuration file is generated according to the service combination information and the service component assembly information to complete the establishment of the service adaptation strategy.

The acquiring information of a respective sub-service of a requested service according to the user context information and the service context information to generate service combination information includes:

the user context information is user's service preference information including type information of a respective user-preferred sub-service; the service context information is information, queried according to the service context information, of all database servers which can provide the requested service;

it is determined, according to the service preference information, a database server which can provide the respective sub-service from all the database servers which can provide the requested service, and acquiring a corresponding sub-service ID is acquired; and the service combination information is generated according to the respective sub-service ID and its corresponding information of the database server.

The selecting a coordinated terminal which can present the requested service as a service component from the terminal group according to the terminal context information; and combining respective service components according to the user context information to generate service component assembly information includes:

the terminal context information is terminal capability information; the user context information is terminal preference information including a device ID and capability information of a terminal which a user prefers regarding to the requested service;

the coordinated terminal which can present the requested service as the service component is selected from the terminal group according to capability information of respective coordinated terminals in the terminal group; a user ID of a user to whom a coordinated terminal serving as the service component belongs is the same as a user ID of the user who requests a service; and a dynamic combination is performed on respective service components according to the terminal preference information to generate the service component assembly information including device IDs of the respective coordinated terminals which can present the requested service and their capability information.

The service shunt strategy includes: an approach for grouping a sub-service stream, interface links and reserved links from the respective coordinated terminals in the terminal group to a core network, an approach for setting stream IDs to respective service sub-streams, and a mapping relation between the stream IDs and the interface links.

and the implementing the service adaptation strategy includes:

a respective sub-service resource is applied in the respective database server according to the sub-service ID and its corresponding information of the database server; and the service adaptation strategy is splitted and then splitted service adaptation strategy is sent to a corresponding coordinated terminal;

and the implementing the service shunt strategy comprises:

the respective sub-service resource is integrated to obtain a resource of the requested service; a sub-service stream grouping is performed on the resource of the requested service according to the approach for grouping a sub-service stream, and stream IDs are set to respective sub-service streams according to the approach for setting stream IDs; and the respective sub-service streams are delivered to their corresponding coordinated terminals through corresponding interface links according to the mapping relation between the stream IDs and the interface links.

The determination of the stream switching triggering condition includes:

network context information and terminal context information are acquired regularly; and it is determined that the stream switching condition is triggered when the network context information and the terminal context information meet a user-predefined rule.

the user-predefined rule includes: when a state or network availability of a specific terminal changes and it is determined that the stream switching triggering condition is triggered, the stream switching type is a stream switching caused by a change in the state or network availability of the specific terminal;

the user-predefined rule includes: when a network availability of a terminal group changes and it is determined that the stream switching triggering condition is triggered, the stream switching type is a stream switching caused by a change in the network availability of the terminal group; and the user-predefined rule includes: when a change in environment of a terminal meets a user-specific terminal preference and it is determined that the stream switching triggering condition is triggered, the stream switching type is a stream switching caused by the meeting of the user-specific terminal preference by the change in environment of the terminal.

The updating the service shunt strategy and/or the service adaptation strategy according to a stream switching type includes:

when the stream switching type is the stream switching caused by a change in the state or network availability of the specific terminal, if a communication of the terminal is interrupted, reserved links are queried to redirect the sub-service streams, and if there are no reserved links, a stream cancellation control is activated, an invalid multi-host stream is deleted and a service shunt strategy is re-established; if a host of the terminal changes, the stream IDs and the interface links are re-mapped;

when the stream switching type is the stream switching caused by a change in the network availability of the terminal group, a pre-link mechanism is adopted, and when a current network availability decreases to a preset level, a link to a new access network is activated and a service shunt strategy is re-established; and when the stream switching type is the stream switching caused by the meeting of the user-specific terminal preference by the change in environment of the terminal, a service adaptation strategy and a service shunt strategy are re-established.

The redirecting a transmission path of a service stream includes:

a transmission path of a sub-service stream is redirected and changed to complete stream switching according to a mapping relation between stream IDs and interface links in a updated service shunt strategy.

The present disclosure further provides an adaptation, shunt transmission and stream switching system for a coordinated service, and the system includes a terminal group consisting of a plurality of coordinated terminals, a media shunt server, a context server and a service decision server, wherein the terminal group is configured to send a request message for service transmission to the media shunt server;

the media shunt server is configured to provide content included in the request message to the service decision server;

the service decision server is configured to: acquire user context information, terminal context information and service context information from the context server according to the content included in the request message, and establish a service adaptation strategy and a service shunt strategy; and is further configured to send the service adaptation strategy and the service shunt strategy to the media shunt server;

the media shunt server is further configured to implement the service adaptation strategy and the service shunt strategy, complete adaptation of the coordinated service, and perform shunt transmission of the coordinated service;

the context server is configured to store the user context information, the terminal context information and the service context information, and acquire regularly network context information and the terminal context information during the shunt transmission; and is further configured to determine, according to acquired network context information and terminal context information, whether a stream switching condition is triggered, and notify the service decision server of a corresponding stream switching type when a determination result is Yes;

the service decision server is further configured to update, according to the stream switching type, the service shunt strategy and/or the service adaptation strategy, and send an updated service shunt strategy and/or service adaptation strategy to the media shunt server; and the media shunt server is further configured to implement the updated service shunt strategy and/or service adaptation strategy, and to redirect a transmission path of a service stream.

The request message includes at least the following information: a user ID, a device ID, an IP address, port information and a service ID;

the user ID is an ID of a user who requests a service; the device ID is a device ID of a respective coordinated terminal in the terminal group; the IP address is an IP address of the respective coordinated terminal; the port information is information of a port transmitting a service in the respective coordinated terminal; and the service ID is an ID of a requested service.

the service decision server is further configured to acquire the user context information according to the user ID; acquire the terminal context information according to the device ID and/or the IP address; and acquire the service context information according to the service ID.

the service decision server is further configured to acquire information of a respective sub-service of a requested service according to the user context information and the service context information to generate service combination information; select a coordinated terminal which can present the requested service as a service component from the terminal group according to the terminal context information; and combine respective service components according to the user context information to generate service component assembly information; and generate a service deployment configuration file according to the service combination information and the service component assembly information to complete the establishment of the service adaptation strategy.

The user context information is user's service preference information including type information of a respective user-preferred sub-service; the service context information is information, queried according to the service context information, of all database servers which can provide the requested service;

and the system further includes a database server;

the service decision server is further configured to determine, according to the service preference information, a database server which can provide the respective sub-service from all the database servers which can provide the requested service, and acquire a corresponding sub-service ID from the database server which can provide the respective sub-service; and generate the service combination information according to the respective sub-service ID and its corresponding information of the database server; and the database server is configured to store and provide the sub-service.

The terminal context information is terminal capability information; the user context information is terminal preference information including a device ID and capability information of a terminal for which a user prefers regarding to the requested service;

the service decision server is further configured to select the coordinated terminal which can present the requested service as the service component from the terminal group according to capability information of respective coordinated terminals in the terminal group; a user ID of a user to whom a coordinated terminal serving as the service component belongs is the same as a user ID of the user who requests a service; and perform a dynamic combination on respective service components according to the terminal preference information to generate the service component assembly information including device IDs of the respective coordinated terminals which can present the requested service and their capability information.

The system further includes a wireless resource management server configured to consult with the service decision server on establishment of the service shunt strategy, and the service shunt strategy includes: an approach for grouping a sub-service stream, interface links and reserved links from the respective coordinated terminals in the terminal group to a core network, an approach for setting stream IDs to respective service sub-streams, and a mapping relation between the stream IDs and the interface links.

The implementing, by the media shunt server, the service shunt strategy includes: applying a respective sub-service resource in the respective database server according to the sub-service ID and its corresponding information of the database server; splitting the service adaptation strategy and then sending splitted service adaptation strategy to a corresponding coordinated terminal; and the implementing the service shunt strategy comprises: integrating the respective sub-service resource to obtain a resource of the requested service; performing a sub-service stream grouping on the resource of the requested service according to the approach for grouping a sub-service stream, and setting stream IDs to respective sub-service streams according to the approach for setting stream IDs; and delivering the respective sub-service streams to their corresponding coordinated terminals through corresponding interface links according to the mapping relation between the stream IDs and the interface links.

The context server is further configured to, when it is determined that regularly-acquired network context information and terminal context information meet a user-predefined rule, judge that the stream switching condition is triggered, and notify the service decision server of a corresponding stream switching type;

the user-predefined rule includes: when a state or network availability of a specific terminal changes and it is determined that the stream switching triggering condition is triggered, the stream switching type being a stream switching caused by a change in the state or network availability of the specific terminal;

the user-predefined rule includes: when a network availability of a terminal group changes and it is determined that the stream switching triggering condition is triggered, the stream switching type being a stream switching caused by a change in the network availability of the terminal group; and the user-predefined rule includes: when a change in environment of a terminal meets a user-specific terminal preference and it is determined that the stream switching triggering condition is triggered, the stream switching type being a stream switching caused by the meeting of the user-specific terminal preference by the change in environment of the terminal.

The service decision server and the wireless resource management server are further configured to update the service shunt strategy and/or the service adaption strategy according to a stream switching type includes:

when the stream switching type is the stream switching caused by a change in the state or network availability of the specific terminal, if a communication of the terminal is interrupted, reserved links are queried to redirect the sub-service streams, and if there are no reserved links, a stream cancellation control is activated, an invalid multi-host stream is deleted and a service shunt strategy is re-established; if a host of the terminal changes, the stream IDs and the interface links are re-mapped;

when the stream switching type is the stream switching caused by a change in the network availability of the terminal group, a pre-link mechanism is adopted, and when a current network availability decreases to a preset level, a link to a new access network is activated and a service shunt strategy is re-established; and when the stream switching type is the stream switching caused by the meeting of the user-specific terminal preference by the change in environment of the terminal, a service adaptation strategy and a service shunt strategy are re-established.

The media shunt server is further configured to redirect and change a transmission path of a sub-service stream to complete stream switching according to a mapping relation between stream IDs and interface links in a updated service shunt strategy.

In the adaptation, shunt transmission and stream switching method and system for a coordinated service according to the present disclosure, a request message for service transmission is received from a terminal group; user context information, terminal context information and service context information are acquired according to the request message, and a service adaptation strategy and a service shunt strategy are established; the service adaptation strategy and the service shunt strategy are implemented, adaptation of the coordinated service is completed, and a shunt transmission of the coordinated service is performed; and during the shunt transmission, when a stream switching triggering condition is determined according to acquired network context information and terminal context information, the service shunt strategy and/or the service adaption strategy are updated according to a corresponding stream switching type, and a transmission path of a service stream is redirected. By the above implementation, high-efficient service transmissions and service presentations are provided to meet user's individual service needs. In addition, the present disclosure provides a processing mechanism (stream switching type) for different stream switching and a service adaptation and shunt method based on stream switching, which implements appropriate a service stream transfer on the basis of service continuity and optimal service experiences of a user.

DETAILED DESCRIPTION

Figure 1:
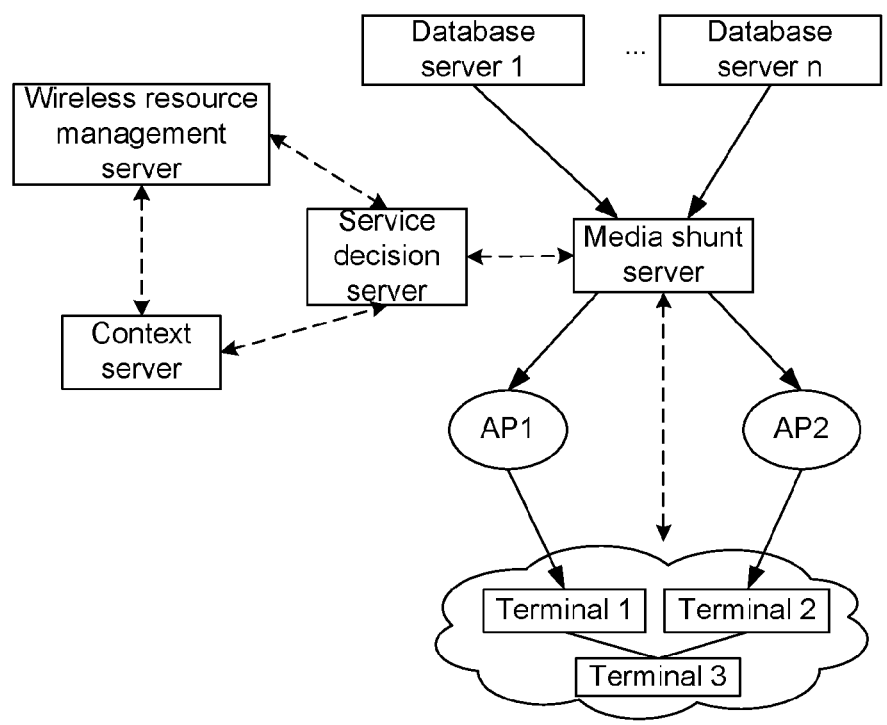
FIG. 1 is a structural diagram of an adaptation and shunt system for a coordinated service according to the present disclosure.

In order to implement service adaptation, shunt transmission and stream switching during provision of a ubiquitous coordinated service, the present disclosure provides a method, which includes:

First, a request message for service transmission is received from a terminal group; and Second, user context information, terminal context information and service context information are acquired according to the request message, and a service adaptation strategy and a service shunt strategy are established.

The request message includes at least the following information: a user ID, a device ID, an IP address, port information and service ID; the user ID is an ID of a user who requests a service; the device ID is a device ID of a respective coordinated terminal in the terminal group; the IP address is an IP address of the respective coordinated terminal; the port information is information of a port transmitting a service in the respective coordinated terminal; and the service ID is an ID of a requested service.

The user context information is acquired according to the user ID; the terminal context information is acquired according to the device ID and/or the IP address; and the service context information is acquired according to the service ID.

Specifically, the establishing a service adaptation strategy includes:

1. Information of a respective sub-service of a requested service is acquired according to the user context information and the service context information to generate service combination information.

The specific implementation of this step includes: the user context information being user's service preference information including type information of a respective user-preferred sub-service; the service context information being information, queried according to the service context information, of all database servers which can provide the requested service;

It is determined, according to the service preference information, a database server which can provide the respective sub-service from all the database servers which can provide the requested service, and a corresponding sub-service ID is acquired;

The service combination information is generated according to the respective sub-service ID and its corresponding information of the database server.

2. A coordinated terminal which can present the requested service is selected as a service component from the terminal group according to the terminal context information; and respective service components are combined according to the user context information to generate service component assembly information.

The specific implementation of this step includes: the terminal context information being terminal capability information; the user context information being terminal preference information including a device ID and capability information of a terminal for which a user prefers regarding to the requested service;

The coordinated terminal which can present the requested service is selected as the service component from the terminal group according to capability information of respective coordinated terminals in the terminal group; a user ID of a user to whom a coordinated terminal serving as the service component belongs is the same as a user ID of the user who requests a service;

a dynamic combination is performed on respective service components according to the terminal preference information to generate the service component assembly information including device IDs of the respective coordinated terminals which can present the requested service and their capability information.

3. A service deployment configuration file is generated according to the service combination information and the service component assembly information to complete the establishment of the service adaptation strategy.

The service shunt strategy includes: an approach for grouping a sub-service stream, interface links and reserved links from the respective coordinated terminals in the terminal group to a core network, an approach for setting stream IDs to respective service sub-streams, and a mapping relation between the stream IDs and the interface links.

Third, the service adaptation strategy and the service shunt strategy are implemented, adaptation of the coordinated service is completed, and a shunt transmission of the coordinated service is performed.

The implementation of the service adaptation strategy includes:

a respective sub-service resource is applied in the respective database server according to the sub-service ID and its corresponding information of the database server; and the service adaptation strategy is splitted and then splitted service adaptation strategy is sent to a corresponding coordinated terminal;

The implementation of the service shunt strategy includes:

the respective sub-service resource is integrated to obtain a resource of the requested service; a sub-service stream grouping is performed on the resource of the requested service according to the approach for grouping a sub-service stream, and stream IDs are set to respective sub-service streams according to the approach for setting stream IDs; and the respective sub-service streams are delivered to their corresponding coordinated terminals through corresponding interface links according to the mapping relation between the stream IDs and the interface links.

during the shunt transmission, when a stream switching triggering condition is determined according to acquired network context information and terminal context information, the service shunt strategy and/or the service adaption strategy are updated according to a corresponding stream switching type, and a transmission path of a service stream is redirected.

The specific implementation of the determination of the stream switching triggering condition includes: network context information and terminal context information are acquired regularly; and it is determined that the stream switching condition is triggered when the network context information and the terminal context information meet a user-predefined rule.

Wherein the user-predefined rule includes: when a state or network availability of a specific terminal changes and it is determined that the stream switching triggering condition is triggered, the stream switching type is a stream switching caused by a change in the state or network availability of the specific terminal;

the user-predefined rule includes: when a network availability of a terminal group changes and it is determined that the stream switching triggering condition is triggered, the stream switching type is a stream switching caused by a change in the network availability of the terminal group; and the user-predefined rule includes: when a change in environment of a terminal meets a user-specific terminal preference and it is determined that the stream switching triggering condition is triggered, the stream switching type is a stream switching caused by the meeting of the user-specific terminal preference by the change in environment of the terminal.

Further, the updating the service shunt strategy and/or the service adaptation strategy according to a stream switching type includes:

when the stream switching type is the stream switching caused by a change in the state or network availability of the specific terminal, if a communication of the terminal is interrupted, reserved links are queried to redirect the sub-service streams, and if there are no reserved links, a stream cancellation control is activated, an invalid multi-host stream is deleted and the service shunt strategy is re-established; if a host of the terminal changes, the stream IDs and the interface links are re-mapped;

when the stream switching type is the stream switching caused by a change in the network availability of the terminal group, a pre-link mechanism is adopted, and when a current network availability decreases to a preset level, a link to a new access network is activated and a service shunt strategy is re-established; and when the stream switching type is the stream switching caused by the meeting of the user-specific terminal preference by the change in environment of the terminal, a service adaptation strategy and a service shunt strategy are re-established.

After the updating is completed, the transmission path of a sub-service stream is redirected and changed to complete stream switching according to a mapping relation between stream IDs and interface links in a updated service shunt strategy.

Based on the above method, the present disclosure further provides a system architecture which, at the premise of changing the structure of an existing network to the least extent, extends functions of the existing network to implement service adaptation, shunt transmission and stream switching during a transmission of a coordinated service. As shown in FIG. 1, the system includes the following functional entities:

a database server, as a data center of a service provider or operator, configured to store services desired by a user and related service information, wherein the number of the database server is not limited to one in order to meet implementation of a service combination in a user-specific need;

a context server configured to maintain dynamically context information of a user, terminal, service and network;

a wireless resource management server configured to, based on management of heterogeneous wireless resources, implement acquisition of related parameters about states and performance of a wireless link, access control and resource allocation when a switch occurs, and whole network load balance by scheduling accessed network resources; besides conventional resources such as spatial and temporal frequencies, the heterogeneous wireless resources further includes other resources in a network side and a terminal side, such as user access permission, service preference, terminal coordination mode, linked network and the like; different resources have different types to which they belong and different features; the heterogeneous wireless resources are derived from different networks or terminals;

a service decision server configured to, based on context information of a user, service, network and terminal acquired from the context server, adapt a user-specific service, generate a service shunt strategy, and generate a service deployment configuration file and a mapping relation between streams and links for a shunt transmission of service data;

a media shunt server configured to receive a service shunt request, request the service decision server to establish a shunt strategy, and configured to receive the shunt strategy from the service decision server and implement with the database server a service shunt transmission. The process of implementing the service shunt transmission includes: service split stream ID allocation, and transmission of different service streams through different access links in accordance with the mapping relation between stream IDs and links to implement the shunt transmission.

Specifically, during the service adaptation, shunt and stream switching, operations implemented by the above functional entities are as follows.

the terminal group is configured to send a request message for service transmission to the media shunt server;

the media shunt server is configured to provide content included in the request message to the service decision server;

the service decision server is configured to: acquire user context information, terminal context information and service context information from the context server according to the content included in the request message, and establish a service adaptation strategy and a service shunt strategy; and is further configured to send the service adaptation strategy and the service shunt strategy to the media shunt server;

the media shunt server is further configured to implement the service adaptation strategy and the service shunt strategy, complete adaptation of the coordinated service, and perform shunt transmission of the coordinated service;

the context server is configured to store the user context information, the terminal context information and the service context information, and acquire regularly network context information and the terminal context information during the shunt transmission; and is further configured to determine, according to acquired network context information and terminal context information, whether a stream switching condition is triggered, and notify the service decision server of a corresponding stream switching type when a determination result is Yes;

the service decision server is further configured to update, according to the stream switching type, the service shunt strategy and/or the service adaptation strategy, and send an updated service shunt strategy and/or service adaptation strategy to the media shunt server; and the media shunt server is further configured to implement the updated service shunt strategy and/or service adaptation strategy, and to redirect a transmission path of a service stream.

The process of implementing coordinatedly the service adaptation, shunt and stream switching by the above functional entities will be elaborated below in combination with FIGS. 2, 3 and 4.

Figure 2:
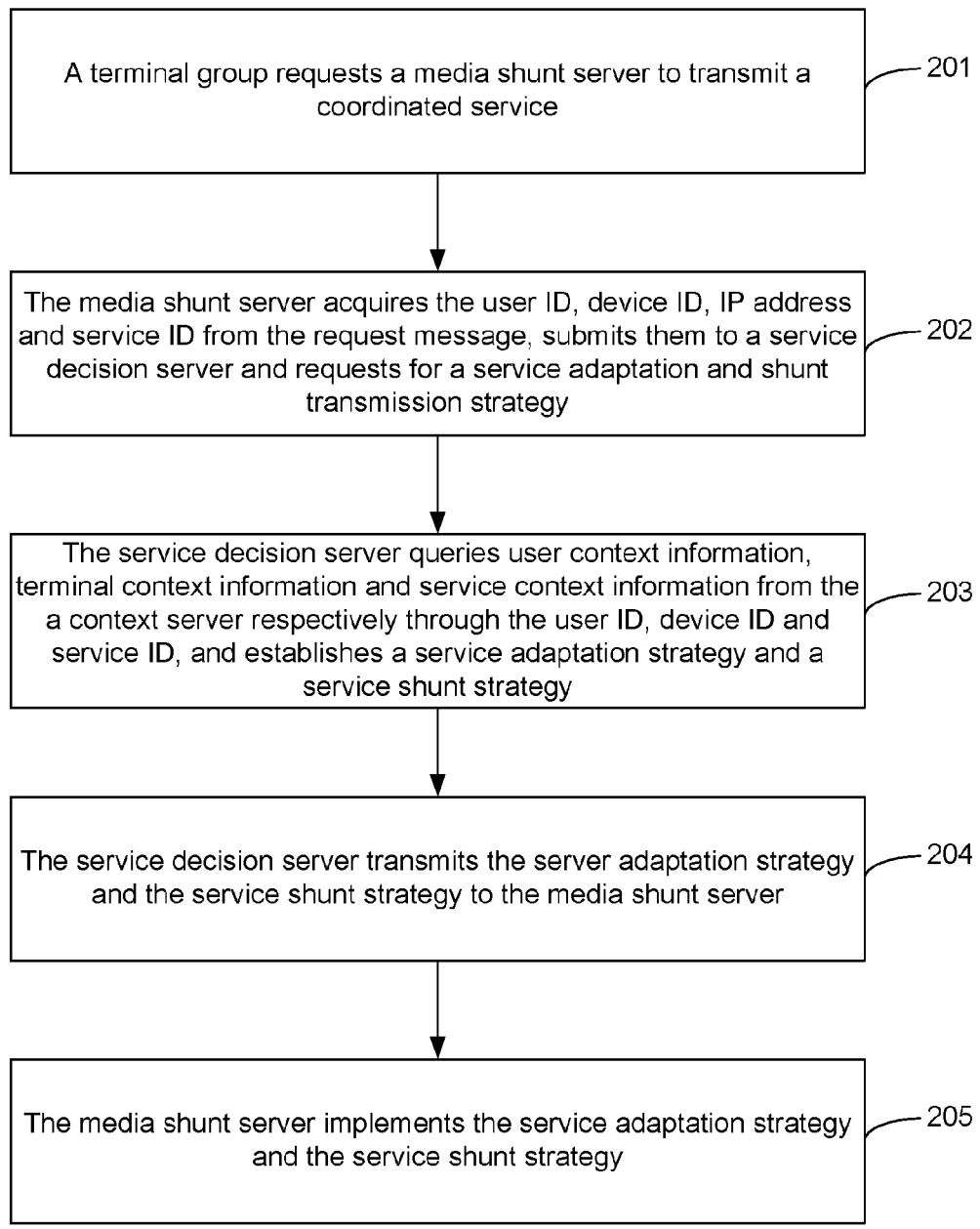
FIG. 2 is a flow chart of an adaptation and shunt transmission method for a coordinated service according to the present disclosure.

The method for implementing adaptation and shunt transmission of a coordinated service is as shown in FIG. 2, and the method includes the following steps:

Step 201, a terminal group requests a media shunt server to transmit a coordinated service.

A user requests the media shunt server to transmit a service through a specific terminal coordinating with peripheral terminals to form a terminal group, preferably, the request message is sent by the specific terminal.

Wherein the specific terminal and the peripheral terminals can be referred to as a coordinated terminal. Each coordinated terminal has a multi-interface feature and can access a variety of networks through multiple interfaces; in addition, multiple coordinated terminals may belong to a same user or to different users respectively, but multiple coordinated terminals for presenting a requested service belong to a same user.

For example, user A requests for a video service through forming his own mobile phone, blue tooth earphone and PDA as a terminal group, then the mobile phone, blue tooth earphone and PDA all belong to user A, and the presentation of the video service is in charge of by these terminals; again for example, user A requests for a video service through forming his own mobile phone, blue tooth earphone, PDA and a PC of user B as a terminal group, then the mobile phone, blue tooth earphone and PDA belong to user A, the PC belong to user B, but when the video service is presented, since it is user A who requests for the service, the presentation of the video service is in charge of by the mobile phone, blue tooth earphone and PDA of user A, and the PC of user B is only used to assist the terminal of user A in downloading service streams of the video service instead of presenting the video service.

The request message includes the following information:

a user ID which represents an ID of a user requesting for a service, wherein in the above example, it is the ID of user A;

a device ID which represents an ID of a coordinated terminal, wherein device IDs of all coordinated terminals are included in the request message;

an IP address which represents an IP address of a coordinated terminal, wherein IP addresses of all coordinated terminals are included in the request message;

port information which represents information of a port transmitting a service in a coordinated terminal, preferably a port number, wherein port information of all coordinated terminals are included in the request message; and a service ID which represents an ID of the requested service.

Step 202, the media shunt server acquires the user ID, device ID, IP address and service ID from the request message, submits them to a service decision server and requests for a service adaptation and shunt transmission strategy.

Step 203, the service decision server queries user context information, terminal context information and service context information from the a context server respectively through the user ID, device ID and service ID, and establishes a service adaptation strategy and a service shunt strategy according to these context information.

Figure 3:
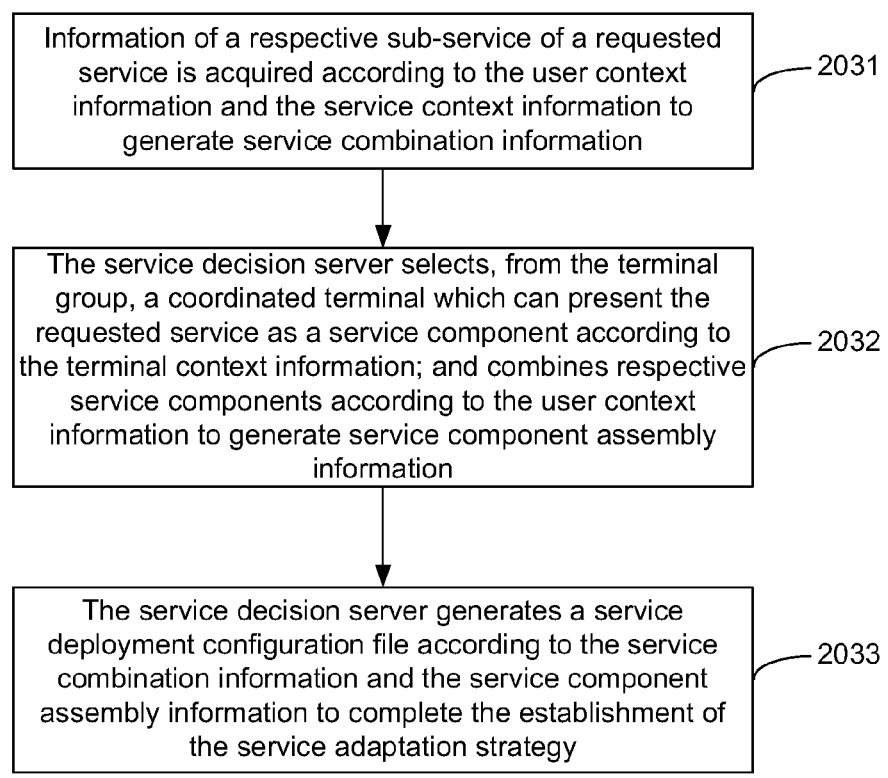
FIG. 3 is a flow chart of a method for establishing a service adaptation strategy according to the present disclosure.
Figure 4:
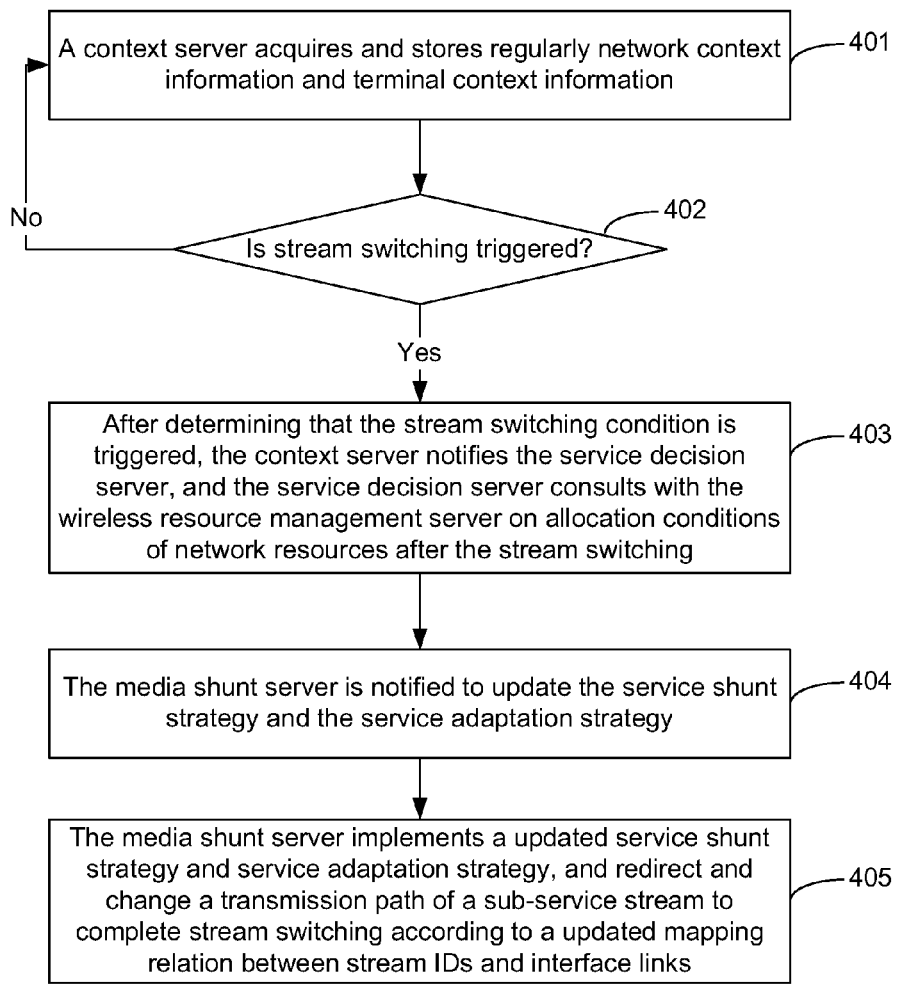
FIG. 4 is a flow chart of a stream switching processing mechanism during a service transmission according to the present disclosure.

First, the establishment of the service adaptation strategy is as shown in FIG. 3, and includes the following steps:

Step 2031, information of a respective sub-service of a requested service is acquired according to the user context information and the service context information to generate service combination information.

The service decision server may query, according to a user ID, from the context server all user context information of the user, and may query, according to a service ID, user context information matched to the requested service from all the user context information.

Here, the user context information mainly refers to user's service preference information, wherein the service preference information indicates specific needs of respective sub-service types of the service. Specifically, a service is made of multiple sub-services, each sub-service corresponds to one or more types, and for a certain sub-service, a user may prefer to use a certain type, therefore the service preference information herein is made of information of sub-service types which a user prefers, and is statistical data obtained according to user habits and/or user settings. For example, for a video service, the service preference information may include sub-services such as video format, definition, audio format and caption, taking the video format as an example, if a user prefer AVI format, the user-specific need for this sub-service type is AVI format.

The service decision server may query information of all database servers which can provide the service from the context server according to the service ID; further, the service decision server is desired to determine a database which can provide a respective sub-service from all the database servers which can provide the service according to user's service preference (i.e., according to a user-specific need for a respective sub-service type of the requested service). Then, the service decision server may acquire information of respective sub-services (mainly sub-service IDs) from these database servers and generate service combination information to complete combination of services meeting user's needs.

The service combination information includes mapping information between sub-service IDs of the requested service and database servers providing the corresponding sub-services.

The process of a service combination is essentially a process of making an individualized combination of respective portions of the service (i.e., respective sub-services) so as to meet user-specific needs, for example, if a user applies for a video service, he/she may have individualized needs for video format, definition, audio format and caption type, then respective sub-services are combined into a service meeting user's needs according to the user's needs.

Step 2032, the service decision server selects a coordinated terminal which can present the requested service as a service component from the terminal group according to the terminal context information; and combines respective service components according to the user context information to generate service component assembly information.

According to the device ID and/or the IP address, the service decision server may query from the context server, terminal context information which mainly refers to capability information of a terminal, since in step 202 the media shunt server submits device IDs of all the coordinated terminals in the terminal group, the service decision server may query capability information of all the coordinated terminals, wherein the capability mainly refers to capability for a terminal to present a service.

Since a service needs to be divided into multiple portions and then presented, the capability information of a terminal represents portions of the service the terminal can present, for example, a playing process of a video service needs to be divided into video playing and audio playing, because a mobile phone can present a video portion as well as an audio portion, the capability information of the mobile phone namely represents that it can present the video portion and the audio portion of a video service.

According to queried capability information of the respective coordinated terminals, the service decision server selects coordinated terminals which can present the requested service for a terminal group, each of the selected coordinated terminals may be referred to as a service component, and this process is namely the screening process of the service component.

Further, the terminal context information queried by the service decision server further includes a user ID corresponding to a terminal. During the screening process of the service component, if a coordinated terminal can present a requested service, but its corresponding user ID is different from an ID of a user who requests the service, the coordinated terminal can not serve as a service component.

The service decision server may query, according to a user ID, from the context server all user context information of the user, and may further determine, according to a service ID, user context information for the requested service from all the user context information.

The user context information herein mainly refers to user's terminal preference information, wherein the terminal preference information indicates a terminal which a user prefers to use and a certain capability of the user-preferred terminal when the service is presented. Specifically, a service may be divided into multiple portions and then presented, for example, a playing process of a video service needs to be divided into video playing and audio playing, for a certain portion to be presented, a user may have specific usage habits or preference for some terminals, therefore, the terminal preference information herein is namely consisted of information of terminals the user prefers to present respective portions of the service, wherein the terminal information mainly includes a device ID and corresponding capability information of the terminal. It should be noted that the capability information herein may be information of all capabilities of the terminal, and also may be information of capabilities of the terminal preferred by the user when the requested service is presented.

According to the terminal preference information of the user, the service decision server combines dynamically screened service components (combines dynamically respective service components according to capability information) to form a completed implementable service logic, i.e., to form a service component assembly which can completely present the requested service. Then the service component assembly information includes an device ID and corresponding capability information of a respective coordinated terminal decided by the service decision server to be used to present the requested service (it can be determined by used capability of a coordinated terminal a portion to be presented in charge of by the coordinated terminal when the service is presented).

It should be noted that since a terminal may have multiple capabilities to present a requested service, multiple service component assemblies may be obtained when service components are dynamically combined. In a service component assembly, for each of service components, only one type of capability information which it presents the requested service is included. It can be determined by a user, by the service decision server or by a certain strategy which specific service component assembly is selected, and there are no limits to the specific way herein.

Step 2033, the service decision server generates a service deployment configuration file according to the service combination information and the service component assembly information to complete the establishment of the service adaptation strategy.

To sum up, the service deployment configuration file (i.e., the service adaptation strategy) includes: service combination information and service component assembly information; wherein the service combination information includes IDs of respective sub-services of the requested service and information about corresponding database servers; and the service component assembly information includes device IDs of respective coordinated terminals which present the requested service and corresponding capability information.

Second, the formulation of the service shunt strategy includes:

The service decision server consults with the wireless resource management server to determine a channel allocation scheme for accessing a core network by respective coordinated terminals which present the requested service in the service component assembly, and the scheme includes: determining interface links from respective coordinated terminals to the core network while reserving reserved links, splitting a service stream to obtain respective service sub-streams for the purpose of maximizing utility of a network, setting stream IDs to respective service sub-streams, establishing a mapping relation between the stream IDs and the interface links and generating a service shunt configuration file to complete the formulation of the service shunt strategy.

Specifically, the content of the service shunt configuration file (i.e., the service shunt strategy) includes: an approach for grouping a sub-service stream (e.g., grouping for the purpose of maximizing utility of a network), interface links and reserved links from the respective coordinated terminals in the terminal group to a core network, an approach for setting stream IDs to respective service sub-streams, and a mapping relation between the stream IDs and the interface links.

Step 204, the service decision server transmits the server adaptation strategy and the service shunt strategy respectively in the form of the service deployment configuration file and the service shunt configuration file to the media shunt server.

Step 205, the media shunt server implements the service adaptation strategy and the service shunt strategy.

The process specifically includes:

the media shunt server analyzes the service deployment configuration file, applies respective sub-service resources in respective database servers according to the respective sub-service IDs and corresponding information about the database servers, splits the service deployment configuration file into sub-service deployment configuration files and sends them to corresponding coordinated terminals for deploying and then implementing.

Moreover, the media shunt server integrates all the applied sub-service resources, groups them according to the service shunt strategy, sets stream IDs, and delivers respective sub-service streams to corresponding coordinated terminals through corresponding interface links according to the mapping relation between the stream IDs and the interface links.

The adaptation and shunt transmission of a coordinated service is implemented through above process.

Further, during a shunt transmission of a coordinated service, there may be a reconfiguration caused by a topological change within a terminal group or a network switching caused by a change of a access point to a core network resulted from movement of the terminal group, thus the service transmission is blocked. In order to enable a service shunt control system to detect this change and thus ensure service continuity through a corresponding adjustment mechanism, the present disclosure further provides a stream switching process, as shown in FIG. 4, the process includes the following steps:

Step 401, a context server acquires and stores regularly network context information and terminal context information.

Wherein the network context information mainly includes network availability and network performance, and the terminal context information mainly includes a position and state of a terminal.

Step 402, the context server determines whether a stream switching condition is triggered according to acquired network context information and terminal context information, if Yes, proceed to step 403, otherwise, return to step 401.

Specifically, if the acquired network context information and terminal context information meet a user-predefined rule, it is determined that the stream switching condition is triggered, and this specifically includes but is not limited to the following three cases:

(1) The user predefined rule is: the state or network availability of a specific terminal changes. If acquired terminal context information indicates that the topology within a terminal group changes, i.e., a specific terminal in the terminal group has its communication interrupted or the address of its destination changed, it is considered that the state or the network availability of the specific terminal changes and it is determined that the stream switching condition is triggered.

(2) The user predefined rule is: the network availability of the terminal group changes. If the acquired network context information and terminal context information indicate that the movement of the terminal group results in a network switch, it is considered that the network availability of the terminal group changes and it is determined that the stream switching condition is triggered.

(3) The user-predefined rule is: the change in terminal environment meets a user-specific terminal preference. If the acquired terminal context information indicates that the environment where a terminal is currently located in agrees with a terminal environment corresponding to the user-specific need, it is considered that the change in terminal environment meets the user-specific terminal preference and it is determined that the stream switching condition is triggered.

According to the above three determination of the stream switching condition, the type of a stream switching can further be determined, i.e., a stream switching caused by a change in the state or network availability of the specific terminal, a stream switching caused by a change in the network availability of the terminal group and a stream switching caused by the meeting of the user-specific terminal preference by the change in environment of the terminal.

Here, the user-predefined rule is a user-predefined rule stored in the context server and/or a user-predefined rule inferred from user preference information.

Further, the user-predefined rule and the user preference information belong to the user context information and are stored in the context server.

It should be noted that besides the above service preference information and terminal preference information, the user preference information further includes but is not limited to: 1) service presentation preference information based on terminal position information, for example, it is desired in mobile environment that a service is presented to the most extent through a mobile phone or other mobile terminal, while it is desired in a home network that a service is presented to the most extent through a laptop, display or audio equipment; 2) service combination approach preference information based on a network bandwidth, for example, a service with good quality is presented to the most extent under the conditions permitted by the network bandwidth through selecting a respective sub-service type; 3) service experiences based on minimum cost. The user preference information may be dynamically adjusted according to practical usage conditions.

Step 403, after determining that the stream switching condition is triggered, the context server notifies the service decision server, and the service decision server consults with the wireless resource management server on allocation conditions of network resources after the stream switching.

The consulted allocation conditions of network resources according to the stream switching type include:

(1) for a stream switching caused by a change in the state or network availability of the specific terminal, if a communication of the terminal is interrupted, reserved links are queried to redirect the sub-service streams, and if there are no reserved links, a stream cancellation control is activated, an invalid multi-host stream is deleted and a service shunt strategy is re-established; if a host of the terminal changes, the stream IDs and the interface links are re-mapped.

(2) for a stream switching caused by a change in the network availability of the terminal group, in order to ensure service continuity, it is desired to adopt a pre-link mechanism, i.e., when the availability of the current network decreases to a preset level, a link to a new access network is activated and a service shunt strategy is re-established to complete a transfer from the current network interface link to a new network interface link.

(3) for a stream switching caused by the meeting of the user-specific terminal preference by the change in environment of the terminal, a service adaptation strategy and a service shunt strategy are desired to be re-established.

Step 404, the media shunt server is notified to update the service shunt strategy and the service adaptation strategy.

For the stream switching caused by a change in the state or network availability of the specific terminal and the stream switching caused by a change in the network availability of the terminal group, the media shunt server is notified to update the service shunt strategy.

For the stream switching caused by the meeting of the user-specific terminal preference by the change in environment of the terminal, the media shunt server is notified to update the service shunt strategy and the service adaptation strategy.

Step 405, the media shunt server implements a updated service shunt strategy and service adaptation strategy, and redirect and change a transmission path of a sub-service stream to complete stream switching according to a updated mapping relation between stream IDs and interface links.

Figure 5:
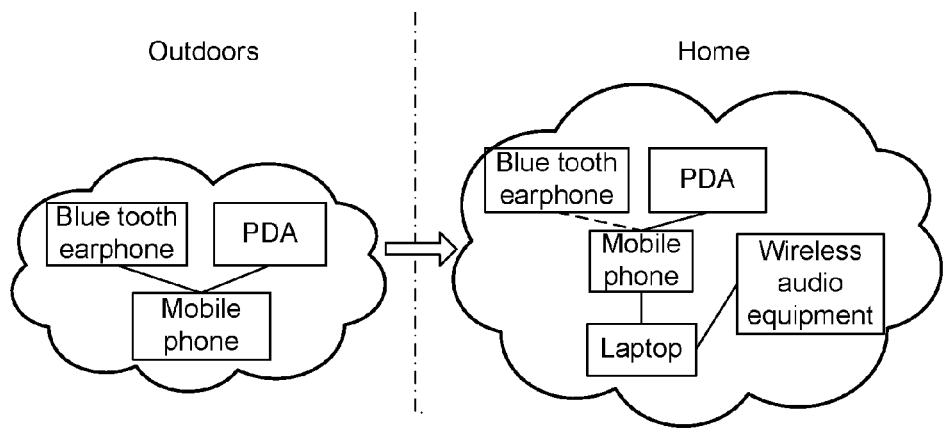
FIG. 5 is a diagram showing scenarios of implementing stream switching and adaptation using the method according to the present disclosure.

FIG. 5 shows a scenario of service adaptation based on stream switching according to an embodiment of the present disclosure, which is shown as follows.

1. A user applies for a coordinated transmission of Video-On-Demand (VOD) by using his/her own mobile phone, blue tooth earphone and PDA to form a terminal group, and according to the user's preference and corresponding terminal capability, the video portion is presented on the mobile phone and the audio portion is played by the blue tooth earphone.

2. After the user goes home, his/her terminal taken along will access automatically the home network, if acquired network context information and terminal context information agree with recorded information of a user-predefined rule, a process of service adaptation based on stream switching will be triggered.

3. The environment around the user is searched for available service components and it is found that a laptop and a wireless audio equipment are in available state, then the service component combination approach is adjusted, and it is defined in a service deployment configuration file that downloaded audio streams are pushed to the wireless audio to be played, and downloaded video streams are pushed to the laptop to be presented.

During the above process, if the user desires to improve the definition of video playing, the communication link between the laptop and a server is regarded as a new link and is added into the service shunt links, so as to extend the service stream transmission bandwidth and re-establish a shunt strategy to play a high-definition video.

What described are merely preferable embodiments of the present disclosure, and are not intended to limit the present disclosure.

The invention claimed is:

1. An adaptation, shunt transmission and stream switching method for a coordinated service, comprising
   receiving a service transmission request message from a terminal group;
   acquiring user context information, terminal context information and service context information according to the request message, and establishing a service adaptation strategy and a service shunt strategy, wherein the service shunt strategy comprises: an approach for grouping a sub-service stream, interface links and reserved links from the respective coordinated terminals in the terminal group to a core network, an approach for setting stream IDs to respective service sub-streams, and a mapping relation between the stream IDs and the interface links;
   implementing the service adaptation strategy and the service shunt strategy, completing adaptation of the coordinated service, and performing a shunt transmission of the coordinated service; and
   during the shunt transmission, when a stream switching triggering condition is determined according to acquired network context information and terminal context information, updating the service shunt strategy and/or the service adaption strategy according to a corresponding stream switching type, and redirecting a transmission path of a service stream.

2. The method according to claim 1, wherein the request message comprises at least the following information: a user ID, a device ID, an IP address, port information and a service ID;
   the user ID is an ID of a user who requests a service; the device ID is a device ID of a respective coordinated terminal in the terminal group; the IP address is an IP address of the respective coordinated terminal; the port information is information of a port transmitting a service in the respective coordinated terminal; and the service ID is an ID of a requested service;
   wherein the step of acquiring user context information, terminal context information and service context information according to the request message comprises:
   acquiring the user context information according to the user ID; acquiring the terminal context information according to the device ID and/or the IP address; and acquiring the service context information according to the the service ID;
   wherein the step of establishing a service adaptation strategy comprises:
   acquiring information of a respective sub-service of a requested service according to the user context information and the service context information to generate service combination information;
   selecting, from the terminal group, a coordinated terminal which can present the requested service as a service component according to the terminal context information;

and combining respective service components according to the user context information to generate service component assembly information; and generating a service deployment configuration file according to the service combination information and the service component assembly information to complete the establishment of the service adaptation strategy.

3. The method according to claim 2, wherein the step of acquiring information of a respective sub-service of a requested service according to the user context information and the service context information to generate service combination information comprises:

the user context information being user's service preference information including type information of a respective user-preferred sub-service; the service context information being information, queried according to the service context information, of all database servers which can provide the requested service;

determining, according to the service preference information, a database server which can provide the respective sub-service from all the database servers which can provide the requested service, and acquiring a corresponding sub-service ID; and generating the service combination information according to the respective sub-service ID and its corresponding information of the database server;

wherein the step of selecting, from the terminal group, a coordinated terminal which can present the requested service as a service component according to the terminal context information and combining all service components according to the user context information to generate service component assembly information comprises:

the terminal context information being terminal capability information; the user context information being terminal preference information including a device ID and capability information of a terminal which a user prefers regarding to the requested service;

selecting the coordinated terminal which can present the requested service as the service component from the terminal group according to capability information of respective coordinated terminals in the terminal group; a user ID of a user to whom a coordinated terminal serving as the service component belongs is the same as a user ID of the user who requests a service; and performing a dynamic combination on respective service components according to the terminal preference information to generate the service component assembly information including device IDs of the respective coordinated terminals which can present the requested service and their capability information.

4. The method according to claim 1, wherein the step of implementing the service adaptation strategy comprises:

applying a respective sub-service resource in the respective database server according to the sub-service ID and its corresponding information of the database server; and splitting the service adaptation strategy and then sending splitted service adaptation strategy to a corresponding coordinated terminal;

the step of implementing the service shunt strategy comprises:

integrating the respective sub-service resource to obtain a resource of the requested service; performing a sub-service stream grouping on the resource of the requested service according to the approach for grouping a sub-service stream, and setting stream IDs to respective sub-service streams according to the approach for setting stream IDs; and delivering the respective sub-service streams to their corresponding coordinated terminals through corresponding interface links according to the mapping relation between the stream IDs and the interface links.

5. The method according to claim 4, wherein the determination of the stream switching triggering condition comprises:

acquiring regularly network context information and terminal context information; and determining that the stream switching condition is triggered when the network context information and the terminal context information meet a user-predefined rule.

6. The method according to claim 5, wherein the user-predefined rule comprises: when a state or network availability of a specific terminal changes and it is determined that the stream switching triggering condition is triggered, the stream switching type being a stream switching caused by a change in the state or network availability of the specific terminal;

the user-predefined rule comprises: when a network availability of a terminal group changes and it is determined that the stream switching triggering condition is triggered, the stream switching type being a stream switching caused by a change in the network availability of the terminal group; and the user-predefined rule comprises: when a change in environment of a terminal meets a user-specific terminal preference and it is determined that the stream switching triggering condition is triggered, the stream switching type being a stream switching caused by the meeting of the user-specific terminal preference by the change in environment of the terminal.

7. The method according to claim 6, wherein the updating the service shunt strategy and/or the service adaption strategy according to a stream switching type comprises:

when the stream switching type is the stream switching caused by a change in the state or network availability of the specific terminal, if a communication of the terminal is interrupted, querying reserved links to redirect the sub-service streams, and if there are no reserved links, activating a stream cancellation control, deleting an invalid multi-host stream and re-establishing a service shunt strategy; if a host of the terminal changes, re-mapping the stream IDs and the interface links;

when the stream switching type is the stream switching caused by a change in the network availability of the terminal group, adopting a pre-link mechanism, and when a current network availability decreases to a preset level, activating a link to a new access network and re-establishing a service shunt strategy; and when the stream switching type is the stream switching caused by the meeting of the user-specific terminal preference by the change in environment of the terminal, re-establishing a service adaptation strategy and a service shunt strategy.

8. The method according to claim 7, wherein the redirecting a transmission path of a service stream comprises:

redirecting and changing a transmission path of a sub-service stream to complete stream switching according to a mapping relation between stream IDs and interface links in a updated service shunt strategy.

9. An adaptation, shunt transmission and stream switching system for a coordinated service, comprising: a terminal group consisting of a plurality of coordinated terminals, a media shunt server, a context server and a service decision server, wherein the terminal group is configured to send a request message for service transmission to the media shunt server;

the media shunt server is configured to provide content included in the request message to the service decision server;

the service decision server is configured to: acquire user context information, terminal context information and service context information from the context server according to the content included in the request message, and establish a service adaptation strategy and a service shunt strategy; and is further configured to send the service adaptation strategy and the service shunt strategy to the media shunt server, wherein the service shunt strategy; comprises: an approach for grouping a sub-service stream, interface links and reserved links from the respective coordinated terminals in the terminal group to a core network, an approach for setting stream IDs to respective service sub-streams, and a mapping relation between the stream IDs and the interface links;

the media shunt server is further configured to implement the service adaptation strategy and the service shunt strategy, complete adaptation of the coordinated service, and perform shunt transmission of the coordinated service;

the context server is configured to store the user context information, the terminal context information and the service context information, and acquire regularly network context information and the terminal context information during the shunt transmission; and is further configured to determine, according to acquired network context information and terminal context information, whether a stream switching condition is triggered, and notify the service decision server of a corresponding stream switching type when a determination result is Yes;

the service decision server is further configured to update, according to the stream switching type, the service shunt strategy and/or the service adaptation strategy, and send an updated service shunt strategy and/or service adaptation strategy to the media shunt server; and the media shunt server is further configured to implement the updated service shunt strategy and/or service adaptation strategy, and to redirect a transmission path of a service stream.

10. The system according to claim 9, wherein the request message comprises at least the following information: a user ID, a device ID, an IP address, port information and a service ID;

the user ID is an ID of a user who requests a service; the device ID is a device ID of a respective coordinated terminal in the terminal group; the IP address is an IP address of the respective coordinated terminal; the port information is information of a port transmitting a service in the respective coordinated terminal; and the service ID is an ID of a requested service.

11. The system according to claim 10, wherein the service decision server is further configured to acquire the user context information according to the user ID; acquire the terminal context information according to the device ID and/or the IP address; and acquire the service context information according to the theg service ID;

the service decision server is further configured to acquire information of a respective sub-service of a requested service according to the user context information and the service context information to generate service combination information; select, from the terminal group, a coordinated terminal which can present the requested service as a service component according to the terminal context information; and combine respective service components according to the user context information to generate service component assembly information; andgenerate a service deployment configuration file according to the service combination information and the service component assembly information to complete the establishment of the service adaptation strategy.

12. The system according to claim 11, wherein the user context information is user's service preference information including type information of a respective user-preferred sub-service; the service context information is information, queried according to the service context information, of all database servers which can provide the requested service;

the system further comprises a database server;

the service decision server is further configured to determine, according to the service preference information, a database server which can provide the respective sub-service from all the database servers which can provide the requested service, and acquire a corresponding sub-service ID from the database server which can provide the respective sub-service; andgenerate the service combination information according to the respective sub-service ID and its corresponding information of the database server; and the database server is configured to store and provide the sub-service.

13. The system according to claim 12, wherein the terminal context information is terminal capability information; the user context information is terminal preference information including a device ID and capability information of a terminal for which a user prefers regarding to the requested service;

the service decision server is further configured to select, from the terminal group, the coordinated terminal which can present the requested service as the service component according to capability information of respective coordinated terminals in the terminal group; a user ID of a user to whom a coordinated terminal serving as the service component belongs is the same as a user ID of the user who requests a service; and perform a dynamic combination on respective service components according to the terminal preference information to generate the service component assembly information including device IDs of the respective coordinated terminals which can present the requested service and their capability information.

14. The system according to claim 13, wherein the system further comprises a wireless resource management server configured to consult with the service decision server on establishment of the service shunt strategy.

15. The system according to claim 14, wherein the implementing, by the media shunt server, the service shunt strategy comprises:

applying a respective sub-service resource in the respective database server according to the sub-service ID and its corresponding information of the database server; splitting the service adaptation strategy and then sending splitted service adaptation strategy to a corresponding coordinated terminal;and the implementing the service shunt strategy comprises: integrating the respective sub-service resource to obtain a resource of the requested service; performing a sub-service stream grouping on the resource of the requested service according to the approach for grouping a sub-service stream, and setting stream IDs to respective sub-service streams according to the approach for setting stream IDs; and delivering the respective sub-service streams to their corresponding coordinated terminals through corresponding interface links according to the mapping relation between the stream IDs and the interface links.

16. The system according to claim 15, wherein the context server is further configured to, when it is determined that regularly-acquired network context information and terminal context information meet a user-predefined rule, judge that the stream switching condition is triggered, and notify the service decision server of a corresponding stream switching type;

the user-predefined rule comprises: when a state or network availability of a specific terminal changes and it is determined that the stream switching triggering condition is triggered, the stream switching type being a stream switching caused by a change in the state or network availability of the specific terminal;

the user-predefined rule comprises: when a network availability of a terminal group changes and it is determined that the stream switching triggering condition is triggered, the stream switching type being a stream switching caused by a change in the network availability of the terminal group; and the user-predefined rule comprises: when a change in environment of a terminal meets a user-specific terminal preference and it is determined that the stream switching triggering condition is triggered, the stream switching type being a stream switching caused by the meeting of the user-specific terminal preference by the change in environment of the terminal.

17. The system according to claim 16, wherein the service decision server and the wireless resource management server are further configured to update the service shunt strategy and/or the service adaption strategy according to a stream switching type comprises:

when the stream switching type is the stream switching caused by a change in the state or network availability of the specific terminal, if a communication of the terminal is interrupted, querying reserved links to redirect the sub-service streams, and if there are no reserved links, activating a stream cancellation control, deleting an invalid multi-host stream and re-establishing a service shunt strategy; if a host of the terminal changes, re-mapping the stream IDs and the interface links;

when the stream switching type is the stream switching caused by a change in the network availability of the terminal group, adopting a pre-link mechanism, and when a current network availability decreases to a preset level, activating a link to a new access network and re-establishing a service shunt strategy; and when the stream switching type is the stream switching caused by the meeting of the user-specific terminal preference by the change in environment of the terminal, re-establishing a service adaptation strategy and a service shunt strategy.

18. The system according to claim 17, wherein the media shunt server is further configured to redirect and change a transmission path of a sub-service stream to complete stream switching according to the mapping relation between stream IDs and interface links in a updated service shunt strategy.

* * * * *